US011903501B1

(12) United States Patent
Bao et al.

(10) Patent No.: US 11,903,501 B1
(45) Date of Patent: Feb. 20, 2024

(54) WINE BOTTLE HOLDER

(71) Applicant: TEAM YTD CO., LIMITED, Hong Kong (HK)

(72) Inventors: Zhiming Bao, Hong Kong (HK); Canqiang Zhang, Hong Kong (HK)

( * ) Notice: Subject to any disclaimer, the term of this patent is extended or adjusted under 35 U.S.C. 154(b) by 0 days.

(21) Appl. No.: 18/329,843

(22) Filed: Jun. 6, 2023

(30) Foreign Application Priority Data

May 30, 2023 (CN) ......................... 202321341478.1

(51) Int. Cl.
*A47G 23/02* (2006.01)
*A47G 23/03* (2006.01)
*F21V 33/00* (2006.01)

(52) U.S. Cl.
CPC ..... *A47G 23/0241* (2013.01); *A47G 23/0309* (2013.01); *F21V 33/0036* (2013.01)

(58) Field of Classification Search
CPC ............ A47G 23/0241; A47G 23/0309; F21V 33/0036
See application file for complete search history.

(56) References Cited

U.S. PATENT DOCUMENTS 2,596,452 A * 5/1952 Wehmiller ......... G01N 21/8803 356/239.4
3,868,047 A * 2/1975 Bersano .................. C12L 11/00 222/166
4,836,476 A * 6/1989 Wolf .................. A47G 23/0241 362/802
5,026,480 A * 6/1991 Fischer ............. A47G 23/0241 210/515
6,793,363 B2 * 9/2004 Jensen ............... A47G 23/0309 362/101
7,080,743 B1 * 7/2006 Wolseth ............... A47B 73/004 211/74
2003/0015487 A1 * 1/2003 Henderson ............. A47F 7/283 211/74
2003/0076672 A1 * 4/2003 Head .................. A47G 23/0309 220/605
2012/0181405 A1 * 7/2012 Zlatic ................... F16M 13/022 29/525.08
2018/0310743 A1 * 11/2018 Abukar .................. A47G 23/02
2020/0157482 A1 * 5/2020 Levin ..................... C12H 1/165

FOREIGN PATENT DOCUMENTS

JP 11346895 A * 12/1999
KR 101466012 B1 * 11/2014

* cited by examiner

*Primary Examiner* — Ko H Chan

(57) ABSTRACT

The present disclosure provides a wine bottle holder. The wine bottle holder includes a bracket configured for placing a wine bottle, a base configured for supporting the bracket, and a first illumination module. The bracket is arranged on the base. The first illumination module is arranged on the bracket and extends along an extension direction of the bracket. The first illumination module is configured for emitting illumination light to irradiate on the wine bottle placed on the bracket.

18 Claims, 6 Drawing Sheets

WINE BOTTLE HOLDER

CROSS-REFERENCE TO RELATED APPLICATIONS

The application claims priority of Chinese patent application CN202321341478.1, filed on May 30, 2023, which is incorporated herein by reference in its entireties.

TECHNICAL FIELD

The present disclosure relates to a wine bottle holder, which is applied to the technical field of wine bottle brackets.

BACKGROUND

People nowadays are increasingly aware of the importance of a quality life and the atmosphere it creates. Therefore, most people often choose to enhance the atmosphere by using red wine or grape wine. At present, wine bottle holders available on the market are merely used for support and exhibition. The design is rigid. The overall holder is of a low artistic style, with a single function. Furthermore, if the wine bottle is of a dark color and has a label stuck thereon, the remaining amount of wine inside the bottle is not easy to observe, leading to inconvenience in checking the remaining amount of wine.

SUMMARY

The present disclosure provides a wine bottle holder including: a bracket configured for placing a wine bottle; a base configured for supporting the bracket, the bracket being arranged on the base; and a first illumination module arranged on the bracket and extending along an extension direction of the bracket and configured for emitting illumination light to irradiate on the wine bottle placed on the bracket.

As the improvement of the present disclosure, the bracket is a curved bracket, two ends of the curved bracket are configured for bearing two ends of the wine bottle respectively, and the first illumination module is arranged on an inner side of the curved bracket.

As the improvement of the present disclosure, the first illumination module is of a curved shape, a first end head of the first illumination module is arranged close to a first end head of the curved bracket, and a second end head of the first illumination module is arranged close to a second end head of the curved bracket.

As the improvement of the present disclosure, the first end head of the curved bracket is higher than the second end head of the curved bracket.

As the improvement of the present disclosure, the first end head of the curved bracket is formed thereon with a placement opening that is configured for holding a bottle neck of the wine bottle, and the second end head of the curved bracket is provided thereon with a bottle bottom holder.

As the improvement of the present disclosure, the bottle bottom holder is formed thereon with a bottle holder hole that is configured for allowing a support frame of the wine bottle to insert.

As the improvement of the present disclosure, further including a control circuit board, wherein a bottom of the base is formed with a third mounting groove, and the control circuit board is arranged inside the third mounting groove.

As the improvement of the present disclosure, the inner side of the curved bracket is formed with a first mounting groove, and the first illumination module is arranged inside the first mounting groove.

As the improvement of the present disclosure, further including a power interface component, wherein the power interface component is electrically connected to the control circuit board, and the bottom of the base is provided with a detachable covering plate corresponding to the third mounting groove.

As the improvement of the present disclosure, a connecting piece is arranged between the bracket and the base, one end of the connecting piece is mounted on the base, the bracket is mounted on the other end of the connecting piece, the base is formed thereon with a second threading hole, the bracket is formed thereon with a first threading hole, the connecting piece is formed with a through hole, a connection lead penetrates through the through hole, one end of the connection lead is connected to the first illumination module through the first threading hole communicated with the first mounting groove, and the other end of the connection lead is electrically connected to the control circuit board through the second threading hole communicated with the third mounting groove.

As the improvement of the present disclosure, the first illumination module includes a lampshade and an illumination device, the illumination device is arranged between the first mounting groove and the lampshade and is electrically connected to the control circuit board, and the lampshade covers the first mounting groove.

As the improvement of the present disclosure, the lampshade is a curved lampshade and includes a transparent shade plate and mounting side plates arranged on two sides of the transparent shade plate, the transparent shade plate has a bigger width than a distance between the two mounting side plates, and the two sides of the transparent shade plate are arranged protruding from the two mounting side plates, the mounting side plates are fixedly connected to the transparent shade plate and are arranged inside the first mounting groove, the transparent shade plate covers the first mounting groove, and the lampshade is of a flexible material.

As the improvement of the present disclosure, the bracket is further provided thereon with a hollow insert column for the through hole, and the hollow insert column is inserted into the through hole.

As the improvement of the present disclosure, further including a cup placement area configured for placing a cup body, and the cup placement area is arranged on the base.

As the improvement of the present disclosure, the base further includes a second illumination module that is arranged corresponding to the cup placement area and is configured for emitting light to irradiate on the cup body on the cup placement area.

As the improvement of the present disclosure, further including a light control button, wherein the light control button is arranged on the base and is configured for controlling the first illumination module and the second illumination module; and the light control button is a metal button.

As the improvement of the present disclosure, the first illumination module and/or the second illumination module have/has multiple illumination modes of different colors, and the light control button is configured for generating a control signal based on a user operation and transmitting the control signal to the control circuit board, so that the control circuit board controls the illumination mode of the first illumination module and/or the second illumination module.

As the improvement of the present disclosure, the base further includes a transparent tray, the base is further formed thereon with a second mounting groove, the second illumination module is arranged inside the second mounting groove, the transparent tray is arranged on and covers the second mounting groove, and the transparent tray has a surface form the cup placement area.

As the improvement of the present disclosure, the base includes a first part, a second part and a middle part, the first part and the second part are connected to different sides of the middle part so that the base is of a turn structure, the bracket is connected to the middle part through the connecting piece, and both the first part and the second part are provided thereon with the cup placement area.

As the improvement of the present disclosure, the middle part is provided with a curved inner side surface and a curved outer side surface, an end surface of the first part far away the middle part is a curved surface protruding outward, and an end surface of the second part far away the middle part is a curved surface protruding outward.

In the above wine bottle holder, the light of the first illumination module can irradiate on the wine bottle arranged on the bracket, which when drinking red wine not only can enhance the drink atmosphere, but also is convenient for a user to observe the remaining amount of wine in the bottle, making a better user experience. In addition, the first illumination module is arranged on the bracket and extends along an extension direction of the bracket, that is, the first illumination module can achieve a strip lighting effect, being convenient to observe the amount of wine. Specifically, the first illumination module may be a strip lighting source, also may include multiple dot light sources arranged along a strip in sequence, which form a strip lighting effect.

BRIEF DESCRIPTION OF THE DRAWINGS

The present disclosure is further described below in detail in combination with the accompanying drawings and embodiments.

DETAILED DESCRIPTION OF THE EMBODIMENTS

Referring to FIG. 1 to FIG. 6, a wine bottle holder provided by the present disclosure includes a bracket 1, a base 2 and a first illumination module 3.

The bracket 1 is configured for placing a wine bottle. The bracket 1 is arranged on the base 2, and the base 2 is configured for supporting the bracket 1. The first illumination module 3 is arranged on the bracket 1 and extends along an extension direction of the bracket 1 and is configured for emitting illumination light to irradiate on the wine bottle placed on the bracket 1.

In the above wine bottle holder, the light of the first illumination module 3 can irradiate on the wine bottle arranged on the bracket 1, which when drinking red wine not only can enhance the drink atmosphere, but also is convenient for a user to observe the remaining amount of wine in the bottle, making a better user experience. In addition, the first illumination module 3 is arranged on the bracket 1 and extends along an extension direction of the bracket 1, that is, the first illumination module 3 can achieve a strip lighting effect, being convenient to observe the amount of wine. Specifically, the first illumination module 3 may be a strip lighting source, also may include multiple dot light sources arranged along a strip in sequence, which form a strip lighting effect.

Figure 4:
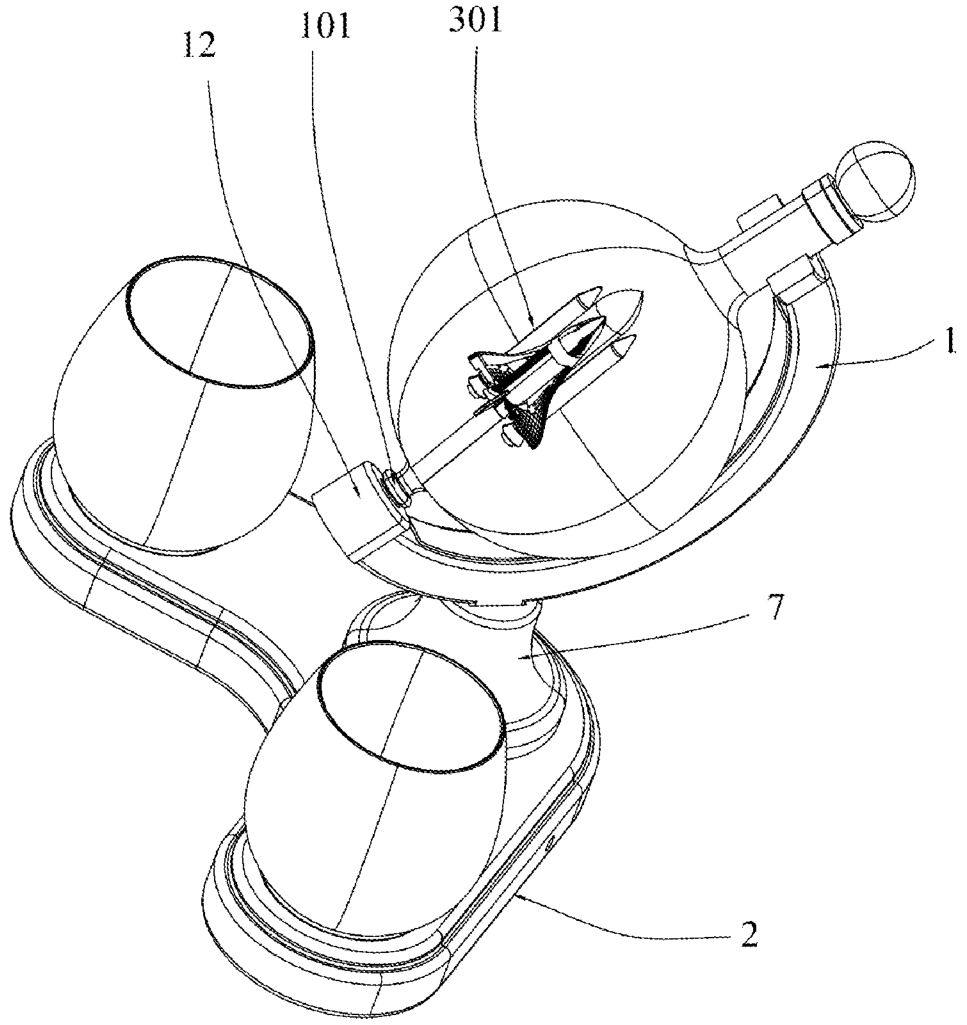
FIG. 4 is a usage state of the wine bottle holder shown in FIG. 1.

A red wine or grape wine bottle may be placed on the bracket 1, also a wine decanter may be placed on the bracket 1, preferably a wine decanter having patterns, or a transparent decanter with an interior ornament 301. As shown in FIG. 4, the inner ornament 301 may be, but not limited to, a rocket shape. When the light of the first illumination module 3 irradiates on the wine decanter having patterns or the transparent decanter with an interior ornament 301, the atmosphere will be greatly enhanced. The first illumination module in the present embodiment may have multiple lighting effects (for example, having various colors of light) which may be set according to manufacturers, for a user to adjust the light, whereby enhancing the user experience.

In the present embodiment, the bracket 1 is a curved bracket, two ends of the curved bracket are configured for bearing two ends of the wine bottle respectively, and the first illumination module 3 is arranged on an inner side of the curved bracket. The wine bottle bracket which is arranged as a curved bracket can suit the shape of the wine bottle, achieving a better supporting effect.

In the present embodiment, the first illumination module 3 is of a curved shape, which can also suit the shape of the wine bottle, achieving a better lighting effect. A first end head of the first illumination module 3 is arranged close to a first end head of the curved bracket, and a second end head of the first illumination module 3 is arranged close to a second end head of the curved bracket. The first illumination module 3 is arranged to occupy the inner curved surface of the curved bracket as much as possible, so that more light is scattered over the wine bottle or the wine decanter more uniformly, making the wine bottle holder in the present embodiment of higher quality and higher artistic style when in use. In the present embodiment, the first end head of the curved bracket is higher than the second end head of the curved bracket, making it more convenient to place the wine bottle and achieving a secure supporting effect.

Figure 1:
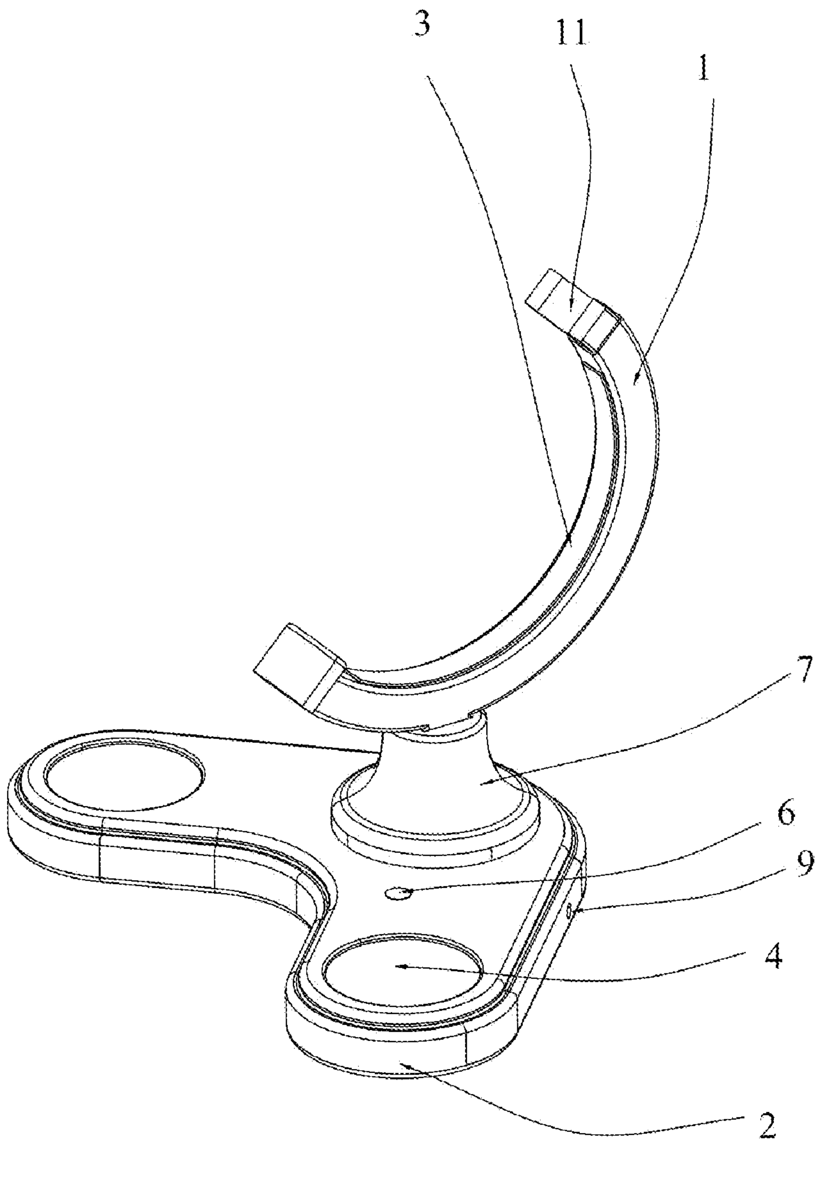
FIG. 1 is a perspective view of an embodiment of a wine bottle holder of the present disclosure.
Figure 2:
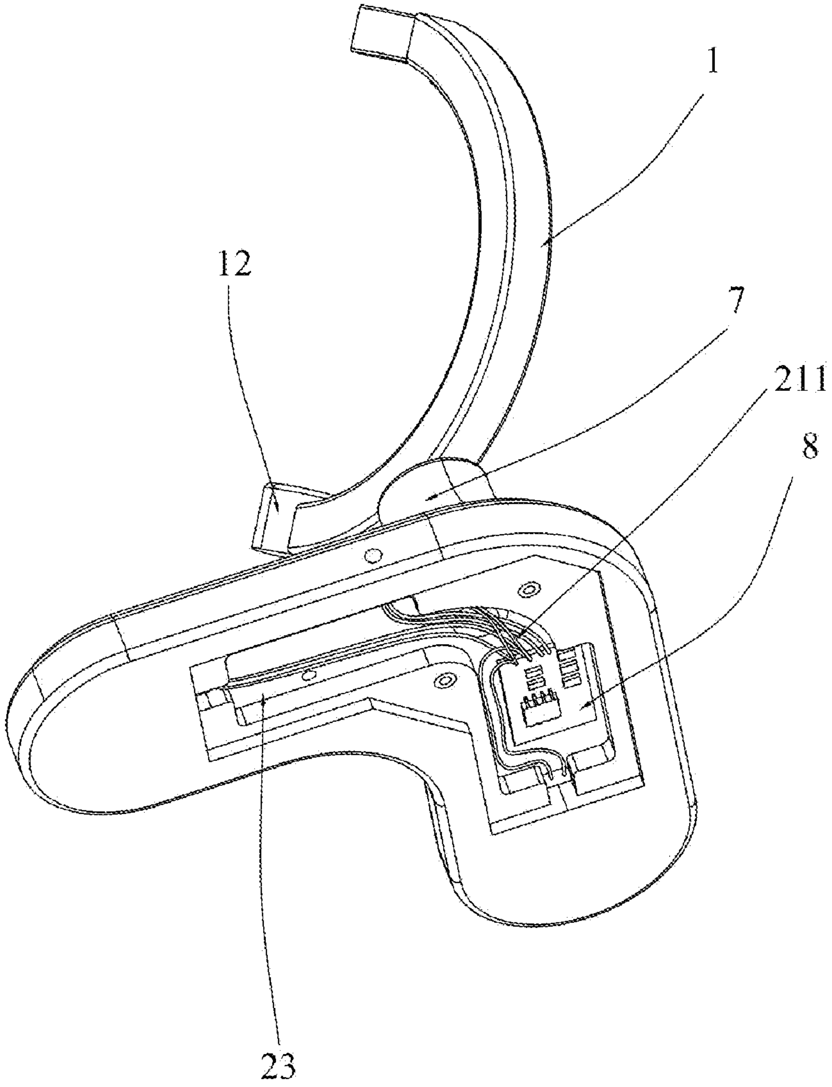
FIG. 2 is a perspective view of the wine bottle holder shown in FIG. 1 from another view.
Figure 3:
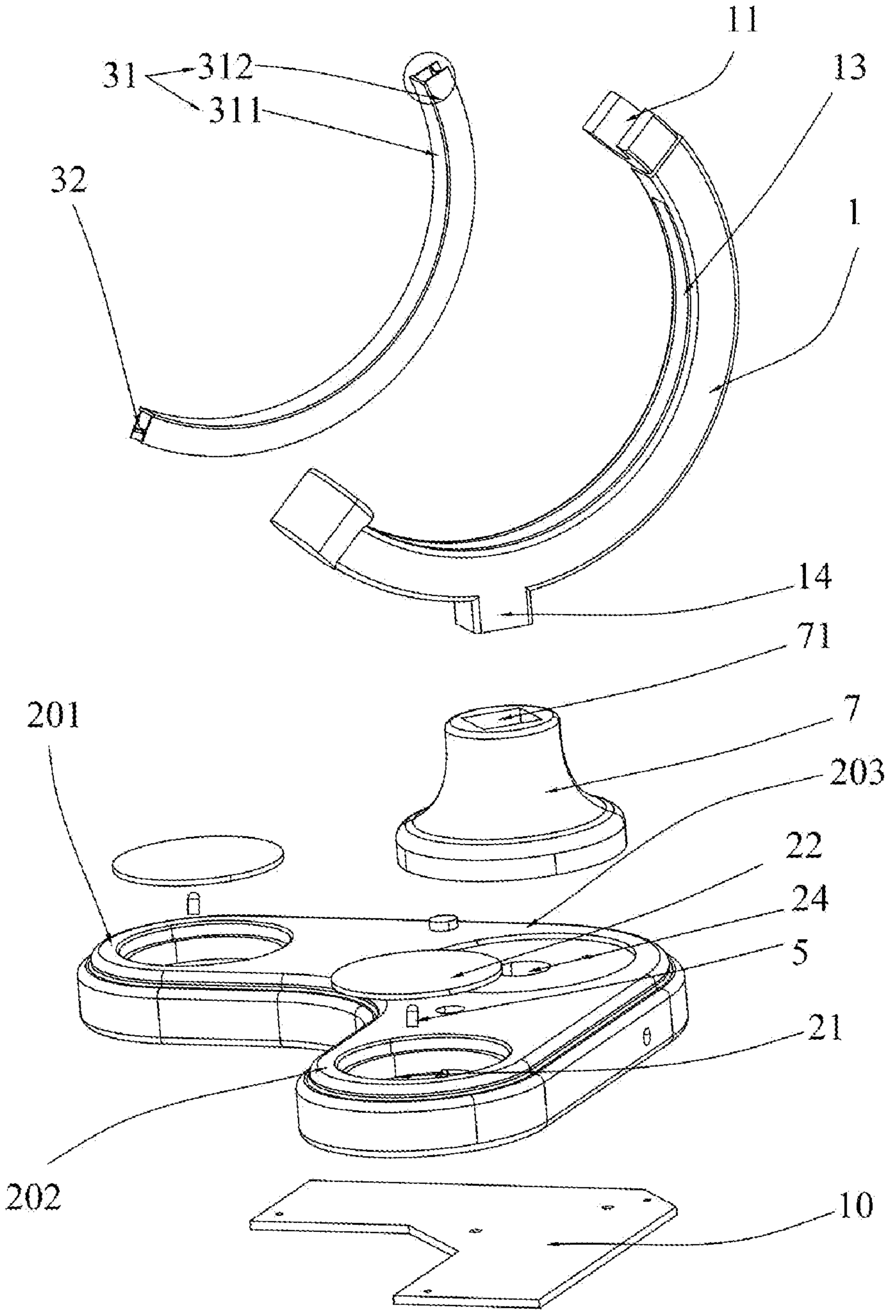
FIG. 3 is an exploded view of the wine bottle holder shown in FIG. 1.
Figure 5:
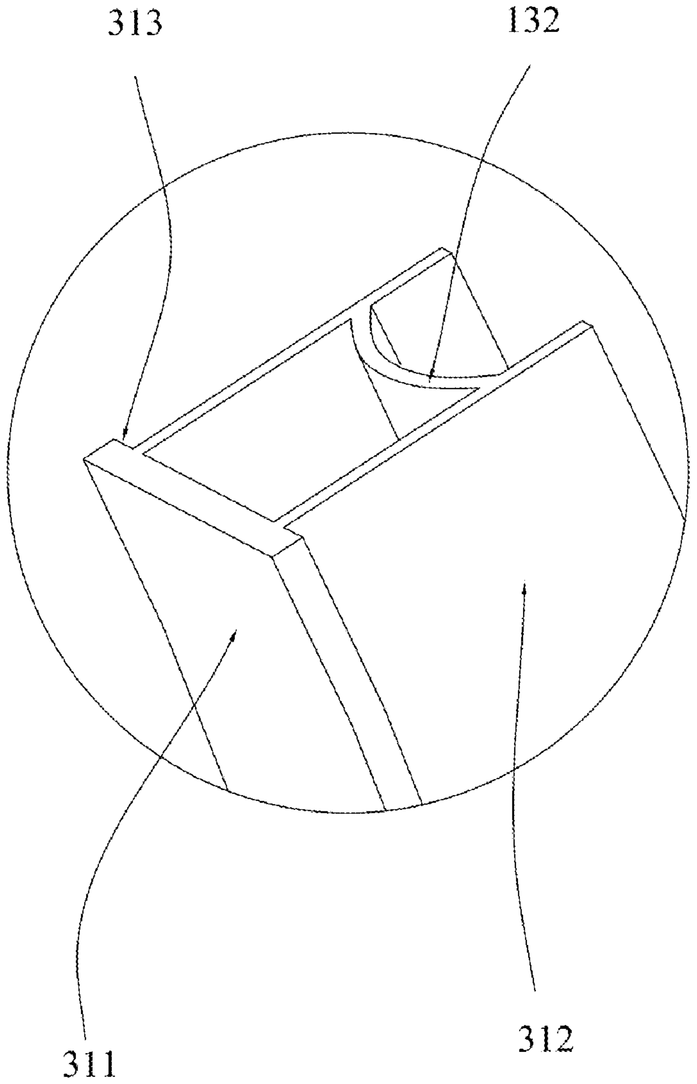
FIG. 5 is a partial enlargement view of the wine bottle holder shown in FIG. 3.
Figure 6:
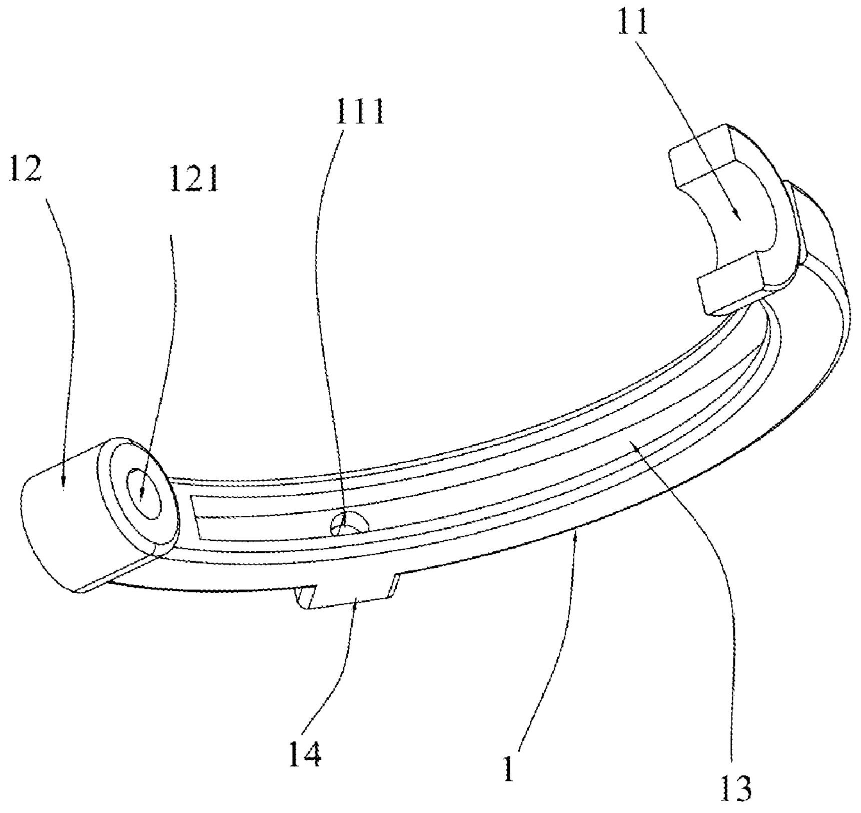
FIG. 6 is a perspective view of a bracket of the wine bottle holder shown in FIG. 1.

In the present embodiment, the first end head of the curved bracket is formed thereon with a placement opening 11 that is configured for holding a bottle neck of the wine bottle, and the second end head of the curved bracket is provided thereon with a bottle bottom holder 12. As shown in FIG. 3, the bottle bottom holder 12 is configured for holding a bottom end of the wine bottle. The first end head of the curved bracket 1 is arranged higher than the second end head of the curved bracket, whereby the wine bottle can be placed more stably. As shown in FIG. 4 to FIG. 5, the bottle bottom holder 12 is formed thereon with a bottle holder hole 121 that is configured for allowing a support frame 101 of the wine bottle to insert, for use with a wine bottle or grape wine decanter with a support frame 101 arranged on the bottom thereof, whereby increasing the practicability of the wine bottle holder in the present embodiment and achieving a secure supporting effect.

In the present embodiment, the wine bottle holder further includes a control circuit board 8, a bottom of the base 2 is formed with a third mounting groove 23, and the control circuit board 8 is arranged inside the third mounting groove 23. The control circuit board 8 can control the switch of light of the first illumination module.

In the present embodiment, the inner side of the curved bracket is formed thereon with a first mounting groove 13, and the first illumination module 3 is arranged inside the first mounting groove 13, making it convenient to mount the first illumination module 3.

In the present embodiment, the wine bottle holder further includes a power interface component 9, the power interface component 9 is electrically connected to the control circuit board 8, and the bottom of the base 2 is provided with a detachable covering plate 10 corresponding to the third mounting groove 23. The arrangement of the power interface component 9 facilitates the electrical connection or charging of the wine bottle holder. The arrangement of the covering plate 10 makes it convenient for a user to repair the circuit of the wine bottle holder and thus prolongs the service life of the wine bottle holder.

In the present embodiment, a connecting piece 7 is arranged between the bracket 1 and the base 2, one end of the connecting piece 7 is mounted on the base 2, the bracket 1 is mounted on the other end of the connecting piece 7, the base is formed thereon with a second threading hole 24, the bracket 1 is formed thereon with a first threading hole 111, the connecting piece is formed with a through hole 71, a connection lead 211 penetrates through the through hole 71, one end of the connection lead 211 is connected to the first illumination module 3 through the first threading hole 111 communicated with the first mounting groove 13, and the other end of the connection lead 211 is electrically connected to the control circuit board 8 through the second threading hole 24 communicated with the third mounting groove 23. The arrangement of the connecting piece makes the overall wine bottle holder look more beautiful. The arrangement of the through hole 71, the first threading hole 111 and the second threading hole 24 facilitates the mounting of the connection lead. In addition, the connection lead is inserted from inside the holder, which can be hidden, making the overall wine bottle holder look tidy.

In the present embodiment, the first illumination module 3 includes a lampshade 31 and an illumination device 32. The illumination device 32 is arranged between the first mounting groove 13 and the lampshade 31 and is electrically connected to the control circuit board 8. The lampshade 31 covers the first mounting groove 13. The lampshade 31 is a curved lampshade and includes a transparent shade plate 311 and mounting side plates 312 arranged on two sides of the transparent shade plate 311. The transparent shade plate 311 has a bigger width than a distance between the two mounting side plates, and the two sides of the transparent shade plate 311 are arranged protruding from the two mounting side plates 312. Refer to FIG. 5 for the protruding part on the two sides, where 313 is a protruding part. The mounting side plates 312 may be fixedly connected to the transparent shade plate 311 and are arranged inside the first mounting groove 13, and the transparent shade plate 311 covers the first mounting groove 13. The lampshade 31 is of a flexible semi-transparent material. The flexible material can facilitate assembly. The illumination device 32 may be an LED lamp or a lamp strip. If an LED lamp is to be arranged, multiple LED lamps are arranged that are evenly distributed inside the first mounting groove, so that the light can be uniformly scattered over the wine bottle as much as possible. If a lamp strip is to be arranged, it may be fixedly arranged between the two side plates.

In the present embodiment, the bracket 1 is further provided thereon with a hollow insert column 14 for the through hole 71, and the hollow insert column 14 is inserted into the through hole 71. Such design makes the mounting easier, requires no extra component, and makes assembly more time-saving and labor-saving.

In the present embodiment, the wine bottle holder further includes a cup placement area 4 configured for placing a cup body, and the cup placement area 4 is arranged on the base 2. The cup placement area 4 is added so that the wine bottle holder is more convenient to use, which not only can place a cup, but also can place a wine decanter or a red wine bottle, whereby achieving multiple functions and improving the user experience. In the present embodiment, multiple cup placement areas 4 may be arranged, preferably two cup placement areas 4 are arranged.

The base 2 further includes a second illumination module 5 that is arranged corresponding to the cup placement area 4 and is configured for emitting light to irradiate on the cup body on the cup placement area 4. The arrangement of the second illumination module makes the wine bottle holder of higher artistic style and enhances the atmosphere of drinking. In the present embodiment, the second illumination module 5 may be an LED lamp.

In the present embodiment, the wine bottle holder further includes a light control button 6. The light control button 6 is arranged on the base 2 and is configured for controlling the first illumination module 3 and the second illumination module 5. The first illumination module 3 and/or the second illumination module 5 have/has multiple illumination modes of different colors. The light control button 6 is configured for generating a control signal based on a user operation and transmitting the control signal to the control circuit board 8, so that the control circuit board 8 controls the illumination mode of the first illumination module 3 and/or the second illumination module 5. A user may select light according to the atmosphere. The number of the light control modes may be set to be greater than or equal to 10. For example, when the light control button 6 is pressed once, it is white light, twice the red light, three times the orange light, four times the purple light, five times the yellow light, and so on. Each time of pressing results in a different color of light. If the light control button 6 is pressed ten times, the light is turned off and hereafter a new cycle starts from the white light. In this way, the user has more light modes to select to adjust the atmosphere. Wherever the wine bottle bolder is placed, the lighting effect may be used to enhance the atmosphere. If not in use, it can still serve as a table lamp.

In the present embodiment, the base 2 is further formed thereon with a second mounting groove 21, and a transparent tray 22 is arranged on the second mounting groove 21. The second illumination module 5 is arranged inside the second mounting groove 21. The transparent tray 22 covers the second mounting groove 21 and the second illumination module 5, and the transparent tray 22 has an upper surface form the cup placement area 4. The transparent tray 22 may be full transparent or semi-transparent, or only a portion of the transparent tray 22 is arranged as a transparent area, depending on actual needs.

In the present embodiment, the base 2 includes a first part 201, a second part 202 and a middle part 203. The first part 201 and the second part 202 are connected to different sides of the middle part 203 so that the base 2 is of a turn structure. The bracket 1 is connected to the middle part through the connecting piece 7, and both the first part 201 and the second part 202 are provided thereon with the cup placement area 4. The middle part 203 is provided with a curved inner side surface and a curved outer side surface. An end surface of the first part 201 far away the middle part 203 is a curved surface protruding outward, and an end surface of the second part 202 far away the middle part 203 is a curved surface protruding outward. The design of the above turn structure facilitates the placement of the base at a corner, occupying less space. Furthermore, the design of the curved surface achieves some impact resistance, thus improves security.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A wine bottle holder, comprising:

a bracket (1) configured for placing a wine bottle;

a base (2) configured for supporting the bracket (1), the bracket (1) being arranged on the base (2); and a first illumination module (3) arranged on the bracket (1) and extending along an extension direction of the bracket (1) and configured for emitting illumination light to irradiate on the wine bottle placed on the bracket (1);

wherein the bracket (1) is a curved bracket, two ends of the curved bracket are configured for bearing two ends of the wine bottle respectively, and the first illumination module (3) is arranged on an inner side of the curved bracket;

wherein the first illumination module (3) is of a curved shape, a first end head of the first illumination module (3) is arranged close to a first end head of the two ends of the curved bracket, and a second end head of the first illumination module (3) is arranged close to a second end head of the two ends of the curved bracket.

2. The wine bottle holder according to claim 1, wherein the first end head of the curved bracket is higher than the second end head of the curved bracket.

3. The wine bottle holder according to claim 1, wherein the first end head of the curved bracket is formed thereon with a placement opening (11) that is configured for holding a bottle neck of the wine bottle, and the second end head of the curved bracket is provided thereon with a bottle bottom holder (12).

4. The wine bottle holder according to claim 3, wherein the bottle bottom holder (12) is formed thereon with a bottle holder hole (121) that is configured for allowing a support frame (101) of the wine bottle to insert.

5. The wine bottle holder according to claim 1, further comprising a control circuit board (8), wherein a bottom of the base (2) is formed with a first mounting groove (23), and the control circuit board (8) is arranged inside the first mounting groove (23).

6. The wine bottle holder according to claim 5, wherein the inner side of the curved bracket is formed with a second mounting groove (13), and the first illumination module (3) is arranged inside the second mounting groove (13).

7. The wine bottle holder according to claim 6, further comprising a power interface component (9), wherein the power interface component (9) is electrically connected to the control circuit board (8), and the bottom of the base (2) is provided with a detachable covering plate (10) configured for covering the first mounting groove (23).

8. The wine bottle holder according to claim 7, wherein a connecting piece (7) is arranged between the bracket (1) and the base (2), one end of the connecting piece (7) is mounted on the base (2), the bracket (1) is mounted on the other end of the connecting piece (7), the base is formed thereon with a second threading hole (24), the bracket (1) is formed thereon with a first threading hole (111), the connecting piece is formed with a through hole (71), a connection lead (211) penetrates through the through hole (71), one end of the connection lead (211) is connected to the first illumination module (3) through the first threading hole (111) communicated with the second mounting groove (13), and the other end of the connection lead (211) is electrically connected to the control circuit board (8) through the second threading hole (24) communicated with the first mounting groove (23).

9. The wine bottle holder according to claim 8, wherein the first illumination module (3) comprises a lampshade (31) and an illumination device (32), the illumination device (32) is arranged between the second mounting groove (13) and the lampshade (31) and is electrically connected to the control circuit board (8), and the lampshade (31) covers the second mounting groove (13).

10. The wine bottle holder according to claim 9, wherein the lampshade (31) is a curved lampshade and comprises a transparent shade plate (311) and mounting side plates (312) arranged on two sides of the transparent shade plate (311), the transparent shade plate (311) has a bigger width than a distance between the two mounting side plates, and the two sides of the transparent shade plate (311) are arranged protruding from the two mounting side plates (312), the mounting side plates (312) are fixedly connected to the transparent shade plate (311) and are arranged inside the second mounting groove (13), the transparent shade plate (311) covers the second mounting groove (13), and the lampshade (31) is of a flexible material.

11. The wine bottle holder according to claim 8, wherein the bracket (1) is further provided thereon with a hollow insert column (14) for the through hole (71), and the hollow insert column (14) is inserted into the through hole (71).

12. The wine bottle holder according to claim 8, further comprising a cup placement area (4) configured for placing a cup body, and the cup placement area (4) is arranged on the base (2).

13. The wine bottle holder according to claim 10, wherein the base (2) further comprises a second illumination module (5) that is arranged corresponding to the cup placement area (4) and is configured for emitting light to irradiate on the cup body on the cup placement area (4).

14. The wine bottle holder according to claim 13, further comprising a light control button (6), wherein the light control button (6) is arranged on the base (2) and is configured for controlling the first illumination module (3) and the second illumination module (5); and the light control button (6) is a metal button.

15. The wine bottle holder according to claim 13, wherein the first illumination module (3) and/or the second illumination module (5) have/has multiple illumination modes of different colors, and the light control button (6) is configured for generating a control signal based on a user operation and transmitting the control signal to the control circuit board (8), so that the control circuit board (8) controls the illumination mode of the first illumination module (3) and/or the second illumination module (5).

16. The wine bottle holder according to claim 13, wherein the base (2) further comprises a transparent tray (22), the base (2) is further formed thereon with a third mounting groove (21), the second illumination module (5) is arranged inside the third mounting groove (21), the transparent tray (22) is arranged on and covers the third mounting groove (21), and the transparent tray (22) has a surface form the cup placement area (4).

17. The wine bottle holder according to claim 12, wherein the base (2) comprises a first part (201), a second part (202) and a middle part (203), the first part (201) and the second part (202) are connected to different sides of the middle part (203) so that the base (2) is of a turn structure, the bracket (1) is connected to the middle part through the connecting piece (7), and both the first part (201) and the second part (202) are provided thereon with the cup placement area (4).

18. The wine bottle holder according to claim 17, wherein the middle part (203) is provided with a curved inner side surface and a curved outer side surface, an end surface of the first part (201) far away the middle part (203) is a curved surface protruding outward, and an end surface of the second part (202) far away the middle part (203) is a curved surface protruding outward.

* * * * *